United States Patent
Belt

[19]

[11] Patent Number: 6,085,001
[45] Date of Patent: Jul. 4, 2000

[54] FIBER OPTIC COUPLER

[76] Inventor: Richard W. Belt, 1190 Hillcrest Rd., Odenton, Md. 31113

[21] Appl. No.: 08/988,761

[22] Filed: Dec. 11, 1997

Related U.S. Application Data

[63] Continuation-in-part of application No. 08/678,667, Jul. 11, 1996, Pat. No. 5,734,767.

[51] Int. Cl.⁷ ..................................................... G02B 6/38
[52] U.S. Cl. .................................. 385/51; 385/98; 385/99
[58] Field of Search ............................... 355/51, 55, 59, 355/65, 95–99

[56] References Cited

U.S. PATENT DOCUMENTS

| | | | |
|---|---|---|---|
| 4,291,940 | 9/1981 | Kawasaki et al. | 350/96.15 |
| 4,330,170 | 5/1982 | Johnson et al. | 350/96.16 |
| 4,392,712 | 5/1983 | Ozeki | 350/96.16 |
| 4,439,221 | 3/1984 | Smyth et al. | 65/4.21 |
| 4,449,781 | 5/1984 | Lightstone et al. | 350/96.15 |
| 4,580,874 | 4/1986 | Winter et al. | 350/96.21 |
| 4,586,784 | 5/1986 | Tremblay et al. | 350/96.15 |
| 4,647,150 | 3/1987 | DeSanti et al. | 350/96.21 |
| 4,746,189 | 5/1988 | Arrington et al. | 350/96.21 |
| 4,763,977 | 8/1988 | Kawasaki et al. | 350/96.15 |
| 4,810,277 | 3/1989 | Waitl et al. | 65/4.21 |
| 4,863,234 | 9/1989 | Gladenbeck et al. | 350/96.21 |
| 4,931,076 | 6/1990 | Berkey | 65/4.2 |
| 5,054,874 | 10/1991 | Hill et al. | 385/28 |
| 5,066,095 | 11/1991 | Dekeyser et al. | 385/99 |
| 5,170,451 | 12/1992 | Ohshima | 385/43 |
| 5,222,176 | 6/1993 | Webber et al. | 385/99 |
| 5,285,512 | 2/1994 | Duncan et al. | 385/94 |
| 5,367,591 | 11/1994 | Seike et al. | 385/51 |
| 5,479,548 | 12/1995 | Cote et al. | 385/51 |
| 5,500,917 | 3/1996 | Daniel et al. | 385/99 |
| 5,533,161 | 7/1996 | Atkeisson et al. | 385/99 |
| 5,784,514 | 7/1998 | Yanagi et al. | 385/99 |
| 5,894,536 | 4/1999 | Rifkin et al. | 385/99 |

FOREIGN PATENT DOCUMENTS

| | | |
|---|---|---|
| 52-30448 | 3/1977 | Japan . |
| 60-21010 | 2/1985 | Japan . |
| WO 90/1175 | 8/1990 | WIPO . |

*Primary Examiner*—Hung N. Ngo
*Attorney, Agent, or Firm*—Rhodes & Mason, PLLC

[57] ABSTRACT

A hermetically sealed fiber optic coupler for packaging planar coupled optical fibers. The device includes at least one first optical fiber having a glass-based portion having a first free end and a second optical fiber having a glass-based portion having a second free end joined to the first free end of the glass-based portion of the first optical fiber by said planar coupler to form an end joint. The device further includes an outer chamber having at least one open end, the outer chamber surrounding the end joint, the outer chamber and the end joint being hermetically sealed with a thermosetting plastic.

36 Claims, 6 Drawing Sheets

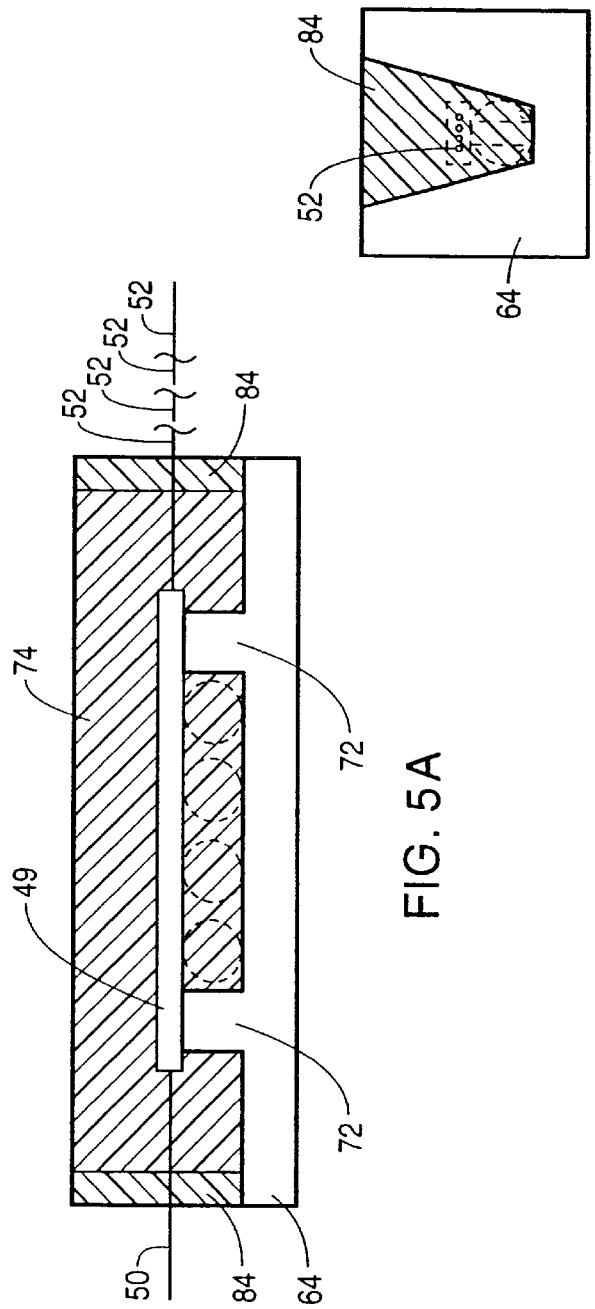

FIBER OPTIC COUPLER

CROSS-REFERENCE TO RELATED APPLICATIONS

The present application is a continuation-in-part of U.S. patent application Ser. No. 08/678,667, filed Jul. 11, 1996 (now U.S. Pat. No. 5,734,767, issued Mar. 31, 1998.

BACKGROUND OF THE INVENTION (1) Field of the Invention

The present invention relates generally to optical fibers, fiber optic components and devices and, more particularly, to a hermetically sealed and packaged fiber optic coupler/splitter.

(2) Description of the Prior Art

Over the last 15 years, a number of fiber optic components and devices such as: couplers, attenuators, wavelength division multiplexers/de-multiplexers, connectors, filters, switches, fiber-pigtailed semiconductor lasers, isolators, etc., have been developed for use in fiber optic communication systems, sensors and instrumentation. In nearly all of these applications employing fiber optic components or devices, design specific mounting fixtures are utilized to precisely align, position or secure optical fibers or elements within such optical fiber components or devices. In most of these applications, it is common for such mounting fixtures to be formed of a fused silica material because its low coefficient of thermal expansion closely matches that of the optical fibers and other optical components or devices. In this respect, maintaining the stability and relative position of optical fibers, components or devices, through the correct choice of materials, is particularly critical in that even minor relative movements between such elements may result in large variations or degradation in optical characteristics, such as coupling ratios and insertion losses.

Optical fibers, components and devices are typically secured with epoxy adhesives. Most common types of epoxy adhesives used in these applications cure upon exposure to either UV light or heat. The epoxy adhesives are widely used because they are inexpensive, easy to use, and in many instances readily cured. Rapid in-situ cure schedules are also well suited for volume manufacturing.

While epoxies offer a convenient means for attaching optical fibers, components or devices to substrates or to other optical fibers, components or devices, the physical properties of cured epoxies often make such materials less than ideally suited for use in fiber optic systems. In one respect, epoxies have a tendency to absorb moisture. Such tendency is detrimental in that moisture significantly reduces an epoxy's ability to firmly secure the optical fiber, optical components or devices, or to a substrate. In addition, the cured epoxy swells as it absorbs water vapor, and this swelling may strain the relative attachment between optical fibers, or optical components, or optical devices or to a supporting substrate. In general, moisture induced swelling and subsequent degradation of the epoxy adhesive may cause misalignment or even detachment of the optical fibers, components or devices relative to a supporting substrate or other optical elements.

As fiber optics continue to penetrate the telecommunications market, product lifetimes of 20 years or more will be mandatory. In order to achieve this degree of performance, new packaging techniques and materials will be required for reliably attaching optical fibers, components, or devices to supporting substrates and to each other.

U.S. Pat. No. 5,500,917, issued to Hani et al., discloses a method of bonding glass-based optical elements, comprising the steps of positioning a first glass-based optical element relative to a second glass-based optical element, applying a glass-based bonding compound about the first and second optical elements, and applying sufficient localized heat to the glass-based bonding compound to cause the glass-based bonding compound to soften and fuse with the optical elements.

U.S. Pat. No. 5,285,512, issued to Duncan et al., discloses a hybrid fiber optic transceiver which includes a transmitter for converting electrical data signals to corresponding light energy, a receiver for converting optical data signals back to electrical data signals and a clock recovery mechanism to maintain the electrical data signals outputs from the receiver in their proper order. The transceiver also includes an optical splitter or coupler that allows light signals to be transmitted and received over a single fiber. The opto-electrical hybrid circuitry of the transceiver and the fiber optic coupler are enclosed in a small light weight package which is hermetically sealed.

U.S. Pat. No. 4,931,076, issued to Berkey, a method of making an economical fiber coupler comprises providing a glass tube having first and second end portions and a midregion, and a longitudinal aperture extending therethrough. Two suitably prepared glass optical fibers, each having a core and cladding, are disposed within the longitudinal aperture, the fibers extending beyond each end thereof. The fibers are held taut to effect a tension therein, and they are glued to each end portion. The midregion of the member is heated, collapsed about the fibers, and drawn to reduce the diameter thereof.

Still, there remains a need for a new and improved fiber optic coupler, especially suitable for planar arrays, which is capable of achieving a product lifetime of twenty years or more. This improved coupler must be sufficiently sealed in order to repel moisture and avoid swelling due to the absorption of such moisture.

SUMMARY OF THE INVENTION

The present invention is directed to a hermetically sealed fiber optic coupler, especially suitable for planar arrays, for packaging end joined optical fibers. The device includes at least one first optical fiber having a glass-based portion having a first free end and a second optical fiber having a glass-based portion having a second free end joined to the first free end of the glass-based portion of the first optical fiber to form an end joint.

The device further includes an outer chamber having at least one open end, the outer chamber surrounding the end joint, the outer chamber and the end joint being hermetically sealed with a thermosetting plastic.

In one preferred embodiment, disclosed in the parent application, the device also includes a primary tubular sleeve, positioned between the end joint and the outer chamber; epoxy for tacking the glass-based portions of the first and second optical fibers to the primary tubular sleeve; and thixotropic epoxy for hermetically sealing the ends of the primary tubular sleeve.

In the preferred embodiment disclosed in this continuation-in-part application, the outer chamber has at least one open face and an enclosed bottom, the outer chamber surrounding the end joint, and the outer chamber and the end joint being hermetically sealed with a thermosetting plastic. In addition, a planar coupler is positioned within the outer chamber for forming the end joint. Finally, arrays attach the glass-based portions of the first and second optical fibers to the planar coupler.

Accordingly, one aspect of the present invention is to provide a hermetically sealed fiber optic coupler for packaging end joined optical fibers. The device includes: (a) at least one first optical fiber having a glass-based portion having a first free end; (b) a second optical fiber having a glass-based portion having a second free end joined to the first free end of the glass-based portion of the first optical fiber to form an end joint; and (c) an outer chamber having at least one open face and an enclosed bottom, the outer chamber surrounding the end joint, the outer chamber and the end joint being hermetically sealed.

Another aspect of the present invention is to provide a hermetically sealed chamber for a fiber optic coupler for packaging planar coupled optical fibers having at least one first optical fiber having a glass-based portion having a first free end; and a second optical fiber having a glass-based portion having a second free end joined to the first free end of the glass-based portion of the first optical fiber by the planar coupler to form an end joint. The device includes an outer chamber having at least one open face and an enclosed bottom, the outer chamber surrounding the end joint formed by the planar coupler, the outer chamber and the end joint being hermetically sealed with a thermosetting plastic.

Still another aspect of the present invention is to provide a hermetically sealed fiber optic coupler for packaging end joined optical fibers. The device includes: (a) at least one first optical fiber having a glass-based portion having a first free end; (b) a second optical fiber having a glass-based portion having a second free end joined to the first free end of the glass-based portion of the first optical fiber to form an end joint; (c) an outer chamber having at least one open face and an enclosed bottom, the outer chamber surrounding the end joint, the outer chamber and the end joint being hermetically sealed with a thermosetting plastic; and (d) a planar coupler positioned within the outer chamber for forming the end joint; and means for attaching the glass-based portions of the first and second optical fibers to the planar coupler.

These and other aspects of the present invention will become apparent to those skilled in the art after a reading of the following description of the preferred embodiment when considered with the drawings.

BRIEF DESCRIPTION OF THE DRAWINGS

FIG. 5A is a cross-sectional side view cut along line 4D of the arrays and planar coupler placed within the outer chamber and having an encapsulating sealant;

FIG. 5B is a first end view of the device shown in FIG. 5A; and

FIG. 5C is a second end view of the device shown in FIG. 5A.

DESCRIPTION OF THE PREFERRED EMBODIMENTS

Figure 1A:
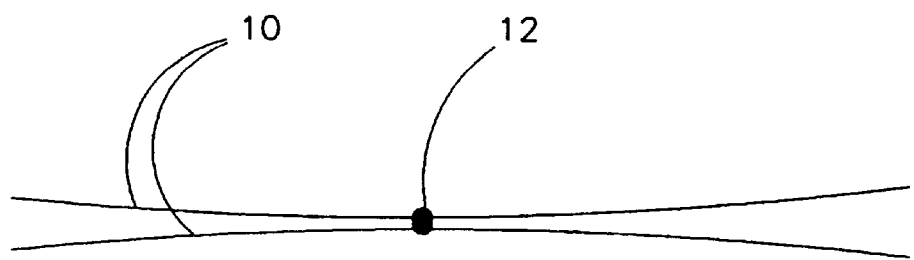
FIGS. 1A–1J are a sequence of diagrams illustrating the method for constructing a hermetically sealed fiber optic coupler package according to the invention disclosed in the parent application.

In the following description, like reference characters designate like or corresponding parts throughout the several views. Also in the following description, it is to be understood that such terms as "forward", "rearward", "left", "right", "upwardly", "downwardly", and the like are words of convenience and are not to be construed as limiting terms.

Referring now to the drawings in general and FIG. 1A in particular, it will be understood that the illustrations are for the purpose of describing a preferred embodiment of the invention and are not intended to limit the invention thereto. As best seen in FIGS. 1A–1J, the process according to the invention disclosed in the parent application begins with the fuse end bonding of two optical fibers to one another at a coupled region (FIG. 1A). Then the coupled region of the optical fibers is bonded to a central receiving substrate.

Figure 1B:
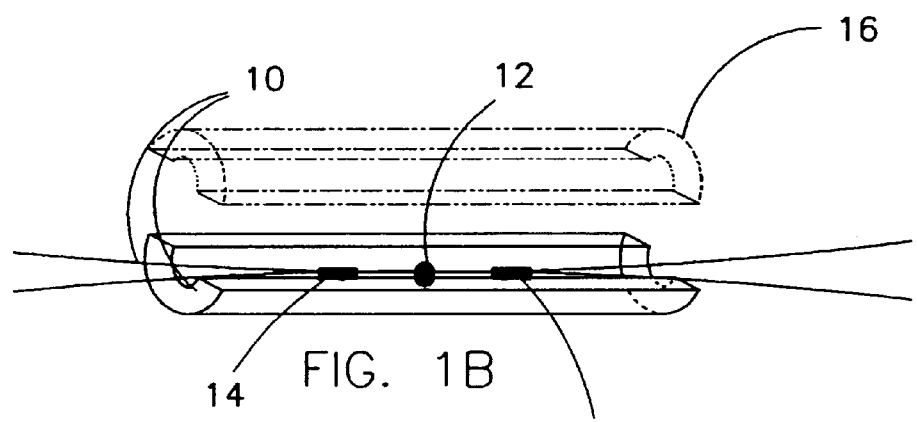
Figure 1C:
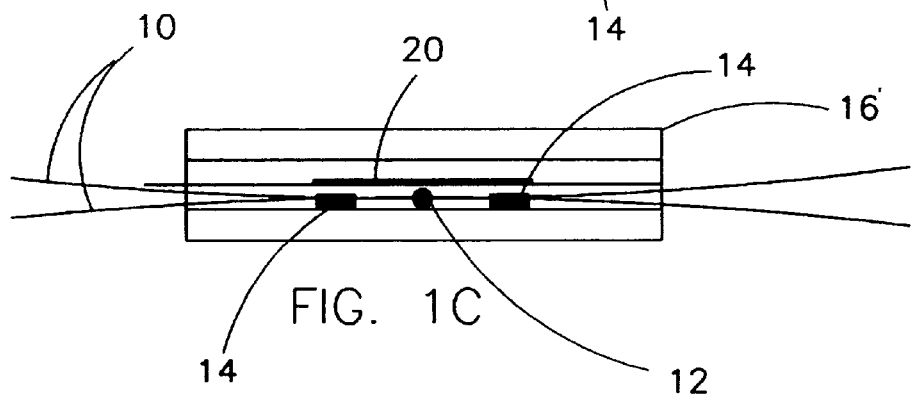
Figure 1D:
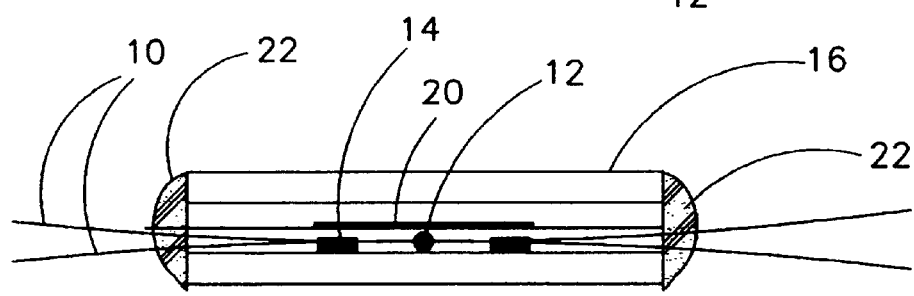

In the preferred embodiment, the central receiving substrate is a clamshell shaped neoceram (a low thermal expansion pyroceramic material) sleeve (FIG. 1B). The clamshell substrate is then placed under a microscope and the shells are cleaned, for the purpose of mating the upper and lower halves of the clamshell substrate. The upper half of the substrate is coated with 353ND thixotropic paste and carefully placed over the lower half of the substrate, FIG. 1C. The now closed neoceram cylinder is placed into a holding fixture, then cured at 100° C. for five minutes.

After cure time, the neoceram cylinder is removed from its fixture and mounted in a rotating 360° fixture, making sure there are no bends in any of the fibers. One side of the neoceram tube is then filled with 353ND thixotropic paste and cured at 120° C. for ten minutes. After cure, the stage is rotated 180° and the other end of the neoceram tube is filled with 353ND thixotropic paste. At this point, the neoceram tube is placed in a vacuum evacuation and penetration system chamber (VEPS).

The VEPSing procedure begins when the VEPS chamber is filled with nitrogen gas. The vacuum is turned on and all valves are closed to produce a vacuum. All ambient air is then drawn out of the chamber. Nitrogen is released again until the chamber has changed its volume. The valves are then closed and a vacuum is produced in the VEPS chamber. When an equal vacuum is achieved in both the VEPS chamber and the glass ceramic sleeve, the vacuum is stopped and the chamber is brought back to an ambient air pressure. As this ambient pressure is achieved, the 353ND thixotropic paste penetrates the ceramic sleeve, producing a hermetic seal.

With the VEPS procedure completed, the ceramic sleeve is removed from the chamber and placed into an oven for a cure at 120° C. for ten minutes. At this point, a primary hermetically sealed chamber is achieved. The fixture is removed from the oven and the primary chamber is encapsulated with 353ND thixotropic paste and cured. After the cure, a secondary INVAR™ tube is positioned over the primary chamber and tacked down with 353ND thixotropic paste and then cured.

Figure 1E:
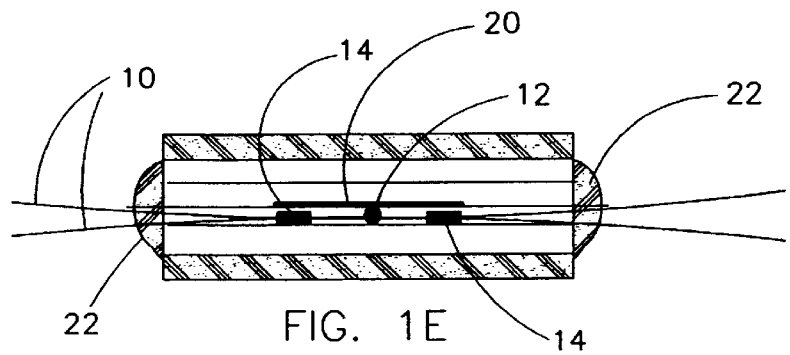
Figure 1F:
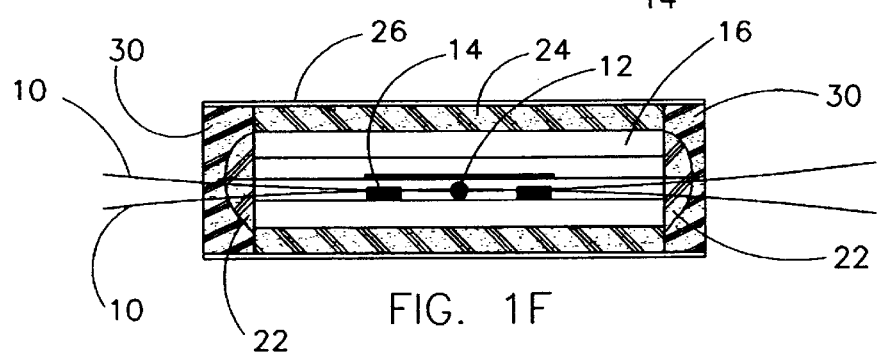
Figure 1G:
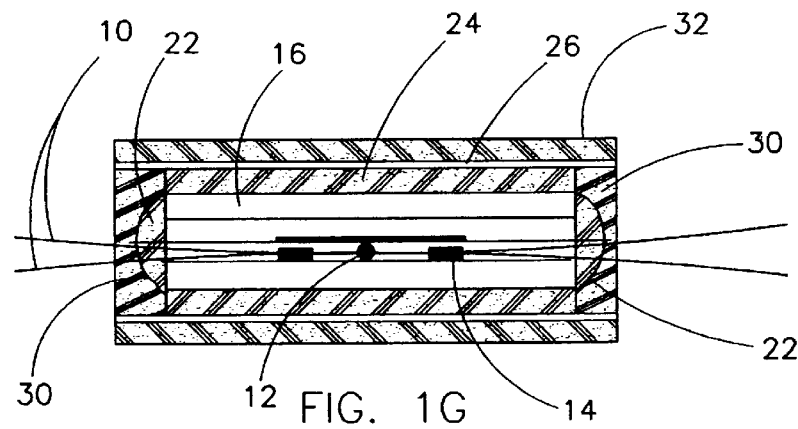

After the cure, the secondary tube is filled at one end with 377 epoxy. The secondary tube is VEPSed and then cured at 150° C. After the cure, the holding stage is rotated 180° and the open end of the secondary tube is filled with 377 epoxy (FIGS. 1E and 1F). The secondary tube is again VEPSed and cured. After the cure, the secondary INVAR tube is encapsulated with 353ND thixotropic paste and cured (FIG. 1G).

Figure 1H:
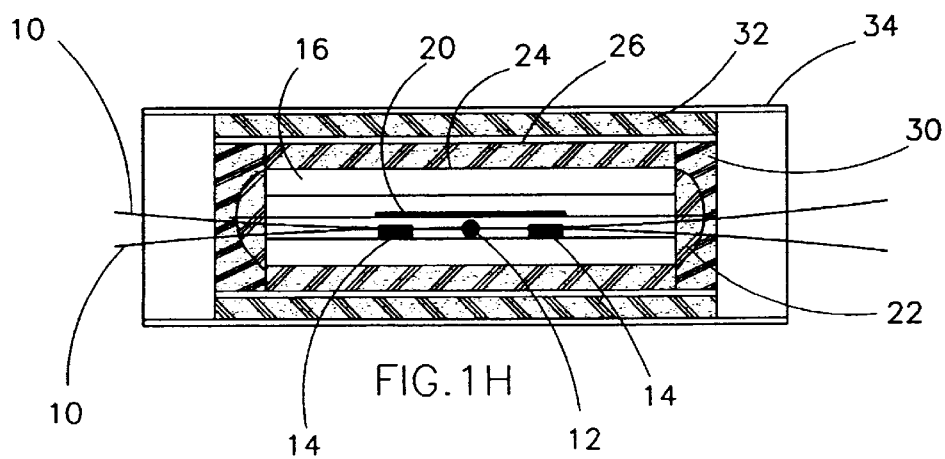
Figure 1I:
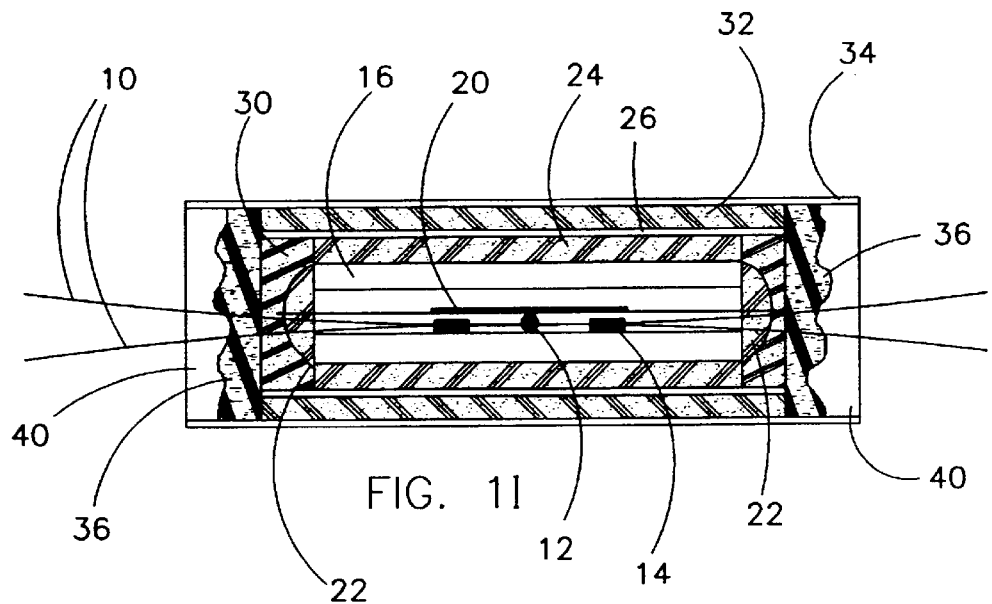

After the cure, the tertiary tube is positioned over the secondary tube encapsulation and tacked down with 353ND thixotropic paste and then cured at 120° C. (FIG. 1H). After the cure, one side of the tertiary tube is filled with 377 epoxy. The tertiary tube is VEPSed and cured. In the preferred embodiment, at least a 1.0 to 1.5 millimeter space from the top of the tertiary tube to the top of the 377 epoxy fill is left for the injection of the room temperature vulcanizing (RTV) boot material. After cure, the stage is rotated 180° and the open end of the tertiary tube is filled again with 377 epoxy, VEPSed and cured (FIG. 1I).

After this final cure process, the coupler is removed from the oven, allowed to cool, and then tested. After the coupler has proven to pass specifications, it is booted with RTV on both ends, and is allowed to cure before it is retested.

Figure 1J:
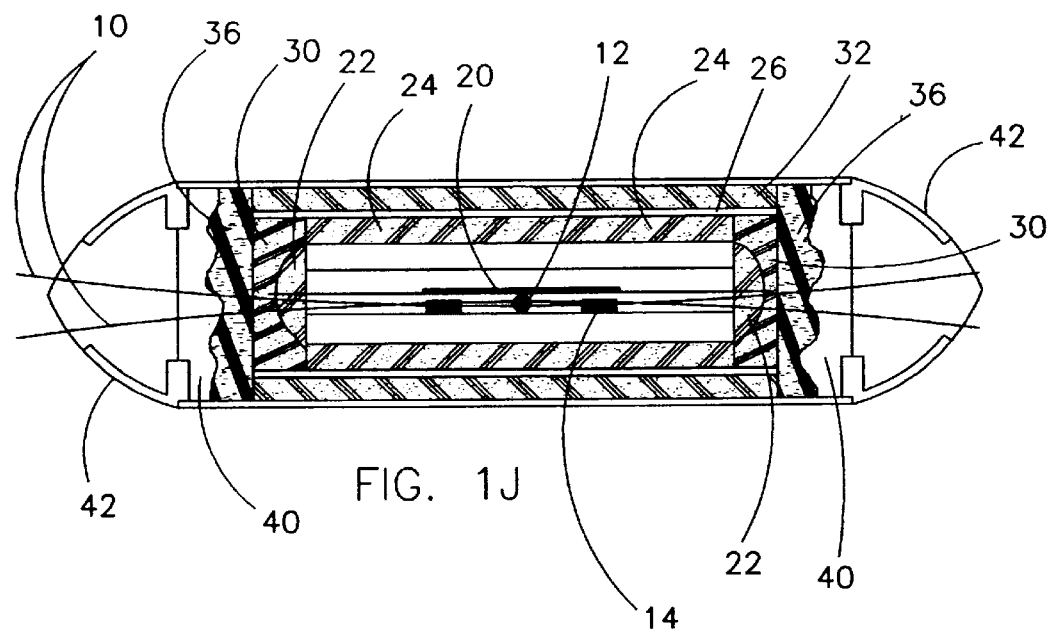

As shown in FIG. 1J, the final product constructed according to the present invention is shown. The figure shows a hermetically sealed/environment-proof fiber-optic coupler package having two fibers 10 fused together at a fused region 12 bonded to the substrate 14 of a clamshell shaped neoceram sleeve 16. The clamshell sleeve is closed and bonded, forming a primary chamber 20. Both ends of the primary chamber being filled with 353 thixotropic paste 22 and the primary chamber being encapsulated with 353ND thixotropic paste 24. The secondary seal INVAR tube 26 is positioned over the primary chamber. Both ends of the secondary tube are filled with 377 epoxy 30 and the secondary tube is encapsulated with 353ND thixotropic paste 32. A tertiary tube 34 is positioned over the secondary tube and the ends of the tertiary tube are filled with 377 epoxy 36, leaving a 1.0 to 1.5 millimeter space 40 between the top of the tertiary tube and the top of the 377 epoxy fill. Finally, RTV boots 42 are added to both ends of the coupler.

Figure 2:
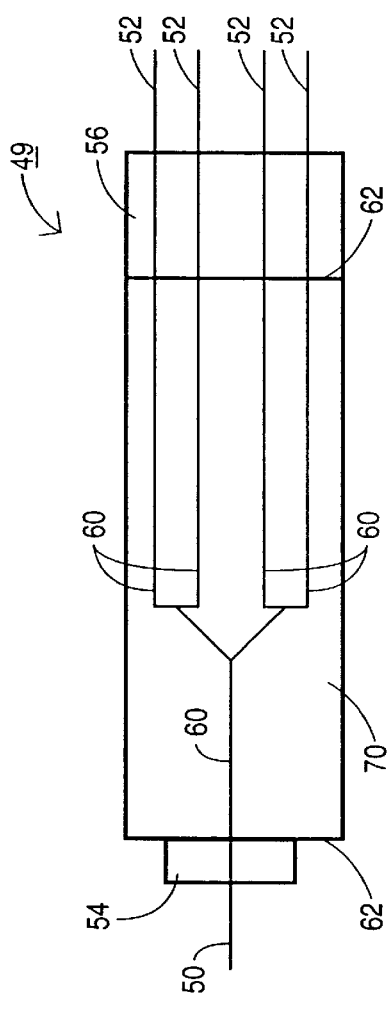
FIG. 2 is a top view of first and second arrays connected to a planar coupler.
Figure 3:
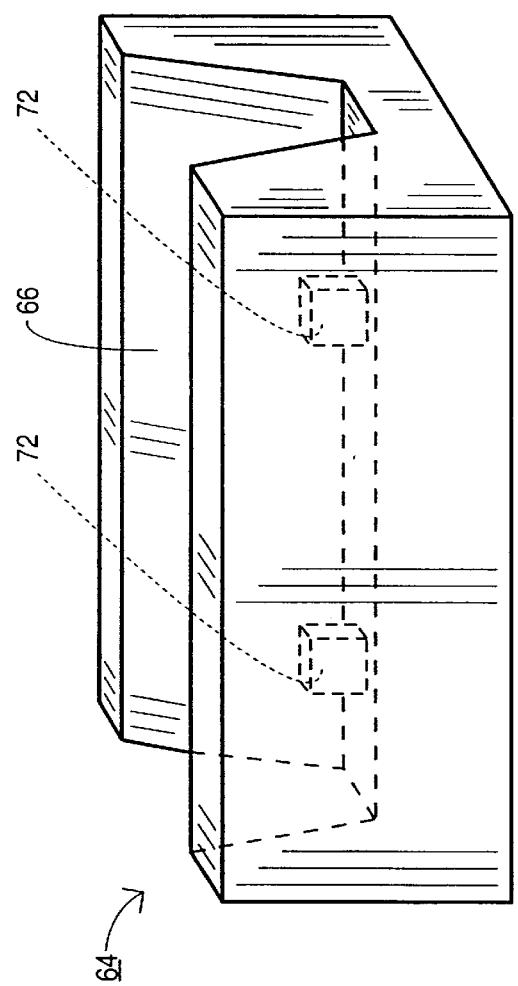
FIG. 3 is a side perspective view of an outer chamber structure constructed according to the present invention.
Figure 4C:
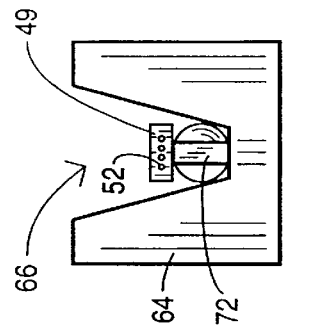
FIG. 4C is a second end view of the device shown in FIG. 4A.
Figure 4A:
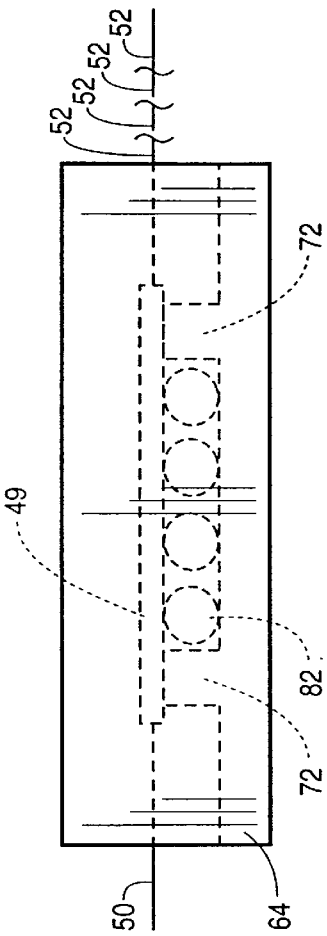
FIG. 4A is a side view of the arrays and planar coupler placed within the outer chamber.
Figure 4D:
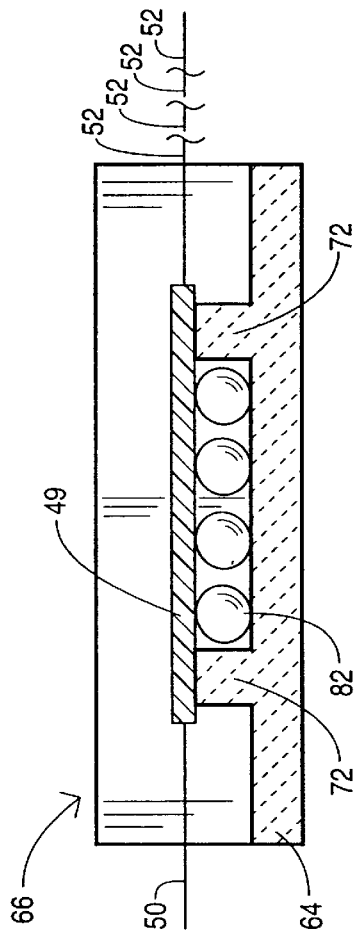
FIG. 4D is a cross-sectional side view of the arrays and planar coupler placed within the outer chamber cut along the line 4D of FIG. 4B.
Figure 4B:
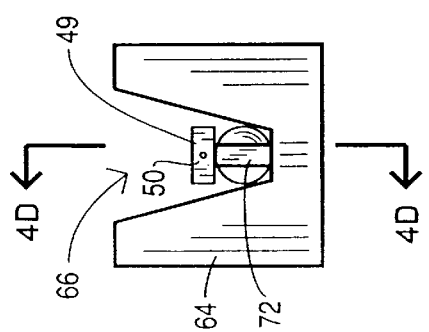
FIG. 4B is a first end view of the device shown in FIG. 4A.

The invention disclosed in the parent application led to looking at the environmental problems experienced by other optical fiber devices, such as planar arrays. As best seen in the FIG. 2, the process according to the present invention includes a first optical fiber 50, a first array 54, a planar coupler 70, a second array 56, and a second optical fiber 52. This structure illustrated in FIG. 2 is placed into an outer chamber 64 shown in FIG. 3 and hermetically sealed as will be discussed below.

The first optical fiber 50 extends from an outside source and is connected into a first array 54. The array 54 provides for connection of the optical fiber 50 with the planar coupler 70 such that signal carried by the optical fiber is not interrupted or disturbed. The first array is aligned and connected to the planar coupler 70 such that the fiber 50 is positioned with the waveguide 60 of the planar coupler as shown in FIG. 2.

Preferably, the attachment 62 between the array 54 and coupler 70 is obtained by a UV curable adhesive, an epoxy, or laser fusion.

The planar coupler 70 is a planar material having a number of waveguides 60. As shown in FIG. 2, one waveguide divides into an array of 4 separate waveguides through the length of the coupler. It will be understood that numerous combinations of waveguide alignments are possible, for example 1×4, 1×8, 1×16, 1×32, etc. The planar coupler 70 is constructed of a planar chip that is known in the art including Splitter, Combiner, Waveguide, and Coupler manufactured by DuPont, Lucent, 3M, Allied-Signal, Ionas, Perrelli, and others. One embodiment shown in FIGS. 2 and 4 illustrates a substantially rectangular shaped waveguide having a thickness substantially less than its width.

A second array 56 is connected to the planar coupler 70. As with the first array 54, the second array 56 provides for connection of optical fibers 52 with the planar coupler 70 such that signal carried by the optical fiber is not interrupted or disturbed. The second array 56 is aligned and connected to the planar coupler 70 such that the fibers 52 are positioned in alignment with the waveguides 60 of the planar coupler as shown in FIG. 2. Preferably, the attachment 62 between the array 56 and coupler 70 is obtained by a UV curable adhesive, an epoxy, or laser fusion.

An outer chamber 64 is substantially open-faced 66 having an enclosed bottom and open ends to receive the planar and array apparatus 49. The chamber 64 is sized to provide for positioning of the apparatus 49 within the chamber and is of sufficient dimensions such that the planar coupler is completely contained within the chamber. In a preferred embodiment, at least one protrusion 72 is spaced on the bottom edge of the chamber. The inserted apparatus 49 rests on the protrusions 72 which provide for a RTV material to encapsulate the optical fibers as they extend from the chamber and also to provide a stress relief to ensure the optical fibers extend from the chamber without bending which could result in attenuation defects. As shown in FIGS. 4 and 5, two protrusions 72 are used to support the apparatus 49, although numerous other arrangements such as a single protrusion or three protrusions may be used for support.

Preferably, the chamber 64 is constructed of a rigid material for protecting the enclosed apparatus 49 from damage. Additionally, it is preferred that the chamber be constructed of a non-porous material, although this is not required for the chamber to function effectively. By way of example, the outer chamber 70 can be constructed of polyetherimides, polyethersulfones, plastics, acrylic, polymers, or others.

In an alternative embodiment, ceramic beads 82 are placed in the trough of the outer chamber to support the apparatus 49. The beads function to support the apparatus off the bottom of the chamber to allow for the encapsulating epoxy to completely encapsulate and hermetically seal around the apparatus 49. As shown in FIGS. 4 and 5, four separate beads 82 may be used for support, although one will understand there are a variety of adequate supporting arrangements including supporting the apparatus with only the protrusions 72, only the beads 82, or a combination of protrusions and beads. The beads 82 are approximately equal in height to the protrusions, and in one preferred embodiment, are about 1 millimeter in diameter. In one embodiment, the beads may be constructed of materials including glass, metal, polyetherimides, polyethersulfones, acrylic, or polymers manufactured by Amoco Polymers or Ensinger Plastics.

A RTV material 84 is placed at each open end of the outer chamber 64. The RTV material 84 acts as a stress relief for the optical fibers 50, 52 as they extend from the apparatus. The material 84 maintains the fibers in the proper alignment without any curvature or bending that could result in attenuation loss. The RTV material 84 further acts as a stop to contain the epoxy 74 within the outer chamber. For example, the RTV material 84 is placed at each end of the outer chamber and allowed to cure and set. The material 74 then acts as a dam to contain the later applied encapsulating epoxy 74 within the outer chamber 64. In an alternative embodiment, the RTV material may be added after the encapsulating epoxy.

At this point, the outer chamber 64 and apparatus 49 are placed in a vacuum evacuation and penetration system chamber (VEPS). The VEPSing procedure begins when the VEPS chamber is filled with nitrogen gas at a pressure of between about 3 to 5 psi. The vacuum is turned on and all valves are closed to produce a vacuum between about 29.5 to 32.5 inches of Hg. All ambient air is then drawn out of the chamber. Nitrogen is released again until the chamber has changed its volume. The valves are then closed and a vacuum is produced in the VEPS chamber. When an equal vacuum is achieved in both the VEPS chamber and the outer chamber and apparatus, the vacuum is stopped and the chamber is brought back to an ambient air pressure. As this ambient pressure is achieved, a 377 epoxy penetrates the outer chamber, producing a hermetic seal, illustrated as 74 in FIG. 5A. The epoxy completely encapsulates the apparatus forming a coating between about 1 to 3 micrometers. In one embodiment, a coating of about 250 microns can be achieved to adequately seal the apparatus. Preferably, 377 epoxy is used for a sealant, although a 353ND thixotropic paste may also be used.

With the VEPS procedure completed, the outer chamber and apparatus is placed into an oven for a cure at 120° C. for ten minutes. At this point, a primary hermetically sealed chamber is achieved. After this final cure process, the coupler is removed from the oven, allowed to cool, and then tested.

As shown in FIGS. 5A, 5B, and 5C, the final product constructed according to the present invention is shown. FIGS. 5A–5C show a hermetically sealed/environment-proof fiber-optic coupler package having a first and second array fused together to a planar coupler. The outer chamber is closed and bonded by 377 epoxy. Optical fibers 50, 52 extend outward from the ends.

Certain modifications and improvements will occur to those skilled in the art upon a reading of the foregoing description. It should be understood that all such modifications and improvements have been deleted herein for the sake of conciseness and readability but are properly within the scope of the following claims.

I claim:

1. A hermetically sealed fiber optic coupler for packaging end joined optical fibers, said device comprising:
   (a) at least one first optical fiber having a glass-based portion having a first free end;
   (b) a second optical fiber having a glass-based portion having a second free end joined to said first free end of the glass-based portion of said first optical fiber to fork an end joint; and
   (c) an outer chamber having at least one open face and an enclosed bottom, an inside bottom surface and spacing means disposed thereon for spacing said first optic fiber, said second optic fiber and said end joint from said bottom surface, said outer chamber surrounding said end joint, said outer chamber and said end joint being hermetically sealed.

2. The device according to claim 1, further including a planar coupler positioned within said outer chamber for forming said end joint; and means for attaching said glass-based portions of said first and second optical fibers to said planar coupler.

3. The device according to claim 2, wherein said planar coupler is a planar chip having a plurality of waveguides.

4. The device according to claim 2, wherein said planar coupler is spaced apart from the inside bottom surface of said outer chamber.

5. The device according to claim 1, wherein said spacing means for spacing said first optic fiber, said second optic fiber and said end joint from the inside bottom surface is at least one protrusion disposed on the inside bottom surface of said outer chamber.

6. The device according to claim 1, further including evacuating said outer chamber to form a vacuum.

7. The device according to claim 6, wherein said vacuum is between about 29.5 to 32.5 inches of Hg.

8. The device according to claim 6, further including backfilling said outer chamber with an inert gas.

9. The device according to claim 8, wherein said inert gas is nitrogen.

10. The device according to claim 9, wherein said nitrogen is at a pressure of between about 3 to 5 psi.

11. The device according to claim 1, wherein said first optical fiber and said second optical fiber are fiber optic arrays having at least one optical fiber.

12. A hermetically sealed chamber for a fiber optic coupler for packaging planar coupled optical fibers having at least one first optical fiber having a glass-based portion having a first free end; and a second optical fiber having a glass-based portion having a second free end joined to said first free end of the glass-based portion of said first optical fiber by said planar coupler to form an end joint; said device comprising: an outer chamber having at least one open face and an enclosed bottom, an inside bottom surface and spacing means disposed thereon for spacing said first optic fiber, said second optic fiber and said end joint from said bottom surface, said outer chamber surrounding said end joint formed by said planar coupler, said outer chamber and said end joint being hermetically sealed with a thermosetting plastic.

13. The device according to claim 12, wherein said thermosetting plastic for hermetically sealing said outer chamber and said end joint is an epoxy.

14. The device according to claim 13, wherein said epoxy is 377 epoxy.

15. The device according to claim 12, further including evacuating said outer chamber to form a vacuum.

16. The device according to claim 12, wherein said outer chamber having at least one open face and an enclosed bottom further includes four sides forming an open topped trough.

17. The device according to claim 16, wherein at least two opposed sides of said outer chamber includes a notch in the top surface of each of said opposed sides to permit said optical fibers to extend from said outer chamber without bending.

18. The device according to claim 17, wherein said notches in said at least two opposed sides of said outer chamber are filled with a RTV material to contain the thermosetting plastic sealant in said outer chamber and to provide a stress relief attachment between said first and said second optical fibers and said outer chamber.

19. A hermetically sealed fiber optic coupler for packaging end joined optical fibers, said device comprising:
   (a) at least one first optical fiber having a glass-based portion having a first free end;
   (b) a second optical fiber having a glass-based portion having a second free end joined to said first free end of the glass-based portion of said first optical fiber to form an end joint;
   (c) an outer chamber having at least one open face and an enclosed bottom, an inside bottom surface and spacing means disposed thereon for spacing said first optic fiber, said second optic fiber, and said end joint from said inside bottom surface, said outer chamber surrounding said end joint, said outer chamber and said end joint being hermetically sealed with a thermosetting plastic; and (d) a planar coupler positioned within said outer chamber for forming said end joint; and means for attaching said glass-based portions of said first and second optical fibers to said planar coupler.

20. The device according to claim 19, wherein said planar coupler is a planar chip having a plurality of waveguides.

21. The device according to claim 19, wherein said planar coupler is spaced apart from the inside bottom surface of said outer chamber.

22. The device according to claim 19, wherein said spacing means for spacing said first optic fiber, said second optic fiber and said end joint from the inside bottom surface of said outer chamber is at least one protrusion disposed on the inside bottom surface of said outer chamber.

23. The device according to claim 19, further including evacuating said outer chamber to form a vacuum.

24. The device according to claim 23, wherein said vacuum is between about 29.5 to 32.5 inches of Hg.

25. The device according to claim 23, further including backfilling said outer chamber with an inert gas.

26. The device according to claim 25, wherein said inert gas is nitrogen.

27. The device according to claim 26, wherein said nitrogen is at a pressure of between about 3 to 5 psi.

28. The device according to claim 19, wherein said first optical fiber and said second optical fiber are fiber optic arrays having at least one optical fiber.

29. The device according to claim 19, wherein said thermosetting plastic for hermetically sealing said outer chamber and said end joint is an epoxy.

30. The device according to claim 29, wherein said epoxy is 377 epoxy.

31. The device according to claim 19, wherein said outer chamber having at least one open face and an enclosed bottom further includes four sides forming an open topped trough.

32. The device according to claim 31, wherein at least two opposed sides of said outer chamber includes a notch in the top surface of each of said opposed sides to permit said optical fibers to extend from said outer chamber without bending.

33. The device according to claim 32, wherein said notches in said at least two opposed sides of said outer chamber are filled with a RTV material to contain the thermosetting plastic sealant in said outer chamber and to provide a stress relief attachment between said first and said second optical fibers and said outer chamber.

34. A method for forming and hermetically sealing a fiber optic coupler for packaging end jointed optical fibers, said method comprising the steps of:

(a) positioning at least one first optical fiber having a glass-based portion having a first free end adjacent to a second optical fiber having a glass-based portion having a second free end;

(b) forming an end joint between said first free end of the glass-based portion of said first optical fiber and said second optical fiber having a glass-based portion having a second free end;

(c) surrounding said end joint with an outer chamber having at least one open end and an enclosed bottom, said enclosed bottom having an inside bottom surface and spacing means disposed thereon for spacing said first optic fiber, said second optic fiber, and said end joint from said inside bottom surface; and (d) hermetically sealing said outer chamber and said end joint.

35. A method for forming and hermetically sealing a fiber optic coupler for packaging planar coupled optical fibers, said method comprising the steps of:

(a) positioning at least one first optical fiber having a glass-based portion having a first free end adjacent to a second optical fiber having a glass-based portion having a second free end;

(b) forming an end joint between said first free end of the glass-based portion of said first optical fiber and said second optical fiber having a glass-based portion having a second free end using a planar coupler;

(c) surrounding said end joint with an outer chamber having at least one open end and an enclosed bottom, said enclosed bottom having an inside bottom surface and spacing means disposed thereon for spacing said first optic fiber, said second optic fiber, and said end joint from said inside bottom surface; and (d) hermetically sealing said outer chamber and said end joint.

36. A method for forming and hermetically sealing a fiber optic coupler for packaging planar coupled optical fibers, said method comprising the steps of:

(a) positioning at least one first optical fiber having a glass-based portion having a first free end adjacent to a second optical fiber having a glass-based portion having a second free end;

(b) forming an end joint between said first free end of the glass-based portion of said first optical fiber and said second optical fiber having a glass-based portion having a second free end using a planar coupler;

(c) surrounding said end joint with an outer chamber having at least one open end and an enclosed bottom, said enclosed bottom having an inside bottom surface and spacing means disposed thereon for spacing said first optic fiber, said second optic fiber, and said end joint from said inside bottom surface; and (d) hermetically sealing said outer chamber and said end joint with a thermosetting plastic.

* * * * *